Feb. 7, 1939. R. L. HIBBARD 2,145,875
CHUCK
Filed April 2, 1937 2 Sheets-Sheet 1

INVENTOR.
ROBERT L. HIBBARD
BY James C. Bradley
ATTORNEY.

Feb. 7, 1939. R. L. HIBBARD 2,145,875
CHUCK
Filed April 2, 1937 2 Sheets-Sheet 2

INVENTOR.
ROBERT L. HIBBARD
BY James C. Bradley
ATTORNEY.

Patented Feb. 7, 1939

2,145,875

UNITED STATES PATENT OFFICE 2,145,875

CHUCK

Robert L. Hibbard, Pittsburgh, Pa., assignor of one-half to William K. Stamets, Pittsburgh, Pa.

Application April 2, 1937, Serial No. 134,622

1 Claim. (Cl. 279—1)

The invention relates to chucks of the power driven type, and particularly to the manually operable means for opening and closing the jaws so as to clamp and unclamp the blank which is held and rotated by the chuck. One of the objects of the invention is to provide greater safety for the operator in the manual operation of the chuck jaws. The chuck and blank are enclosed, and to a large extent concealed by the chuck housing, and the operator may on occasion be under the mistaken impression that the application of power to the chuck has been discontinued when such is not the case, and attempt to operate the hand wheel or equivalent means which opens and closes the chuck jaws. This involves throwing the hand wheel into gear with the jaw operating means, and if the chuck is in rotation, the hand wheel will be turned violently, sometimes with serious injury to the operator. The present invention provides means whereby such an accident is guarded against, the operating means for throwing the hand wheel into gear with the chuck being so coordinated with a switch which controls the drive motor that the current is shut off from the motor before the hand wheel can be placed in gear with the chuck jaw clamping means.

Figure 1:
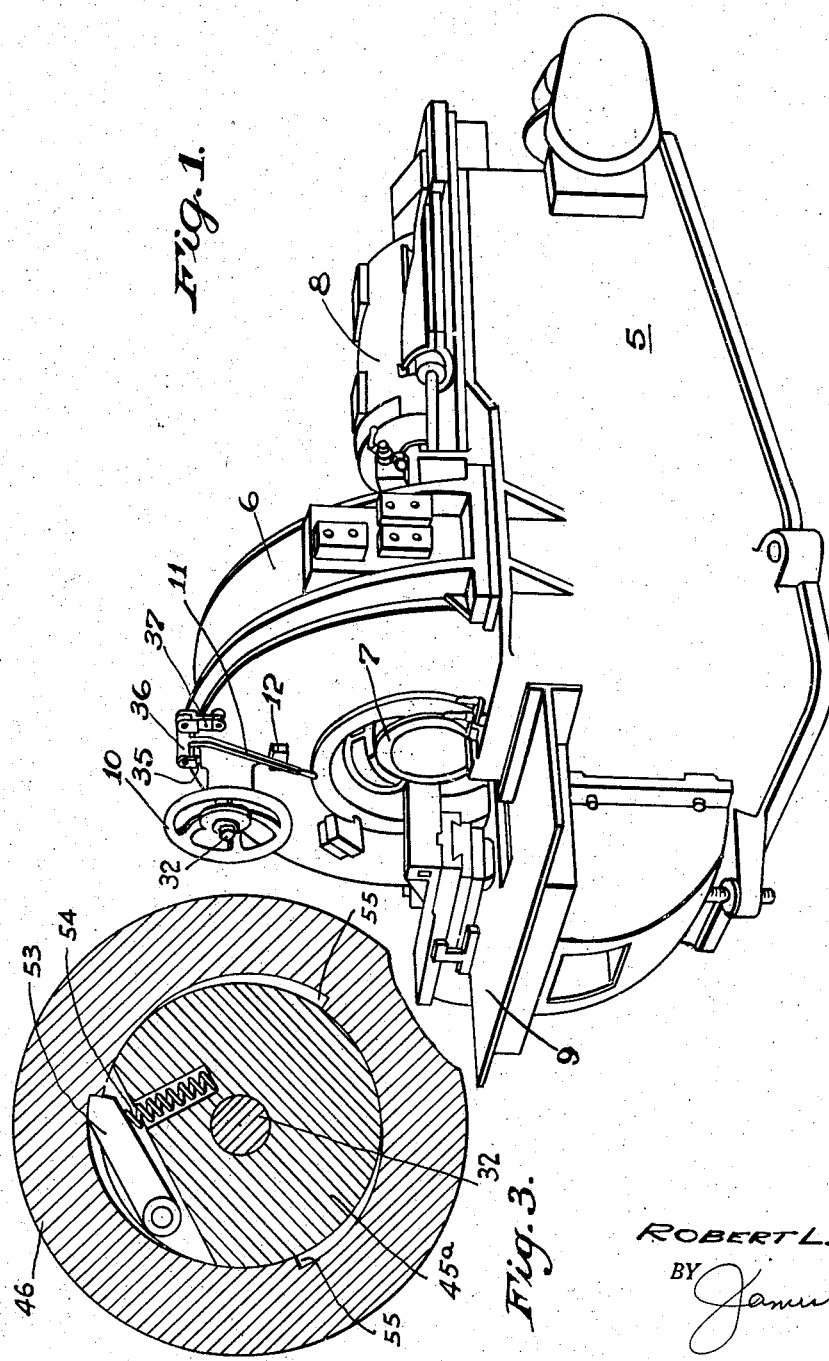
Figure 2:
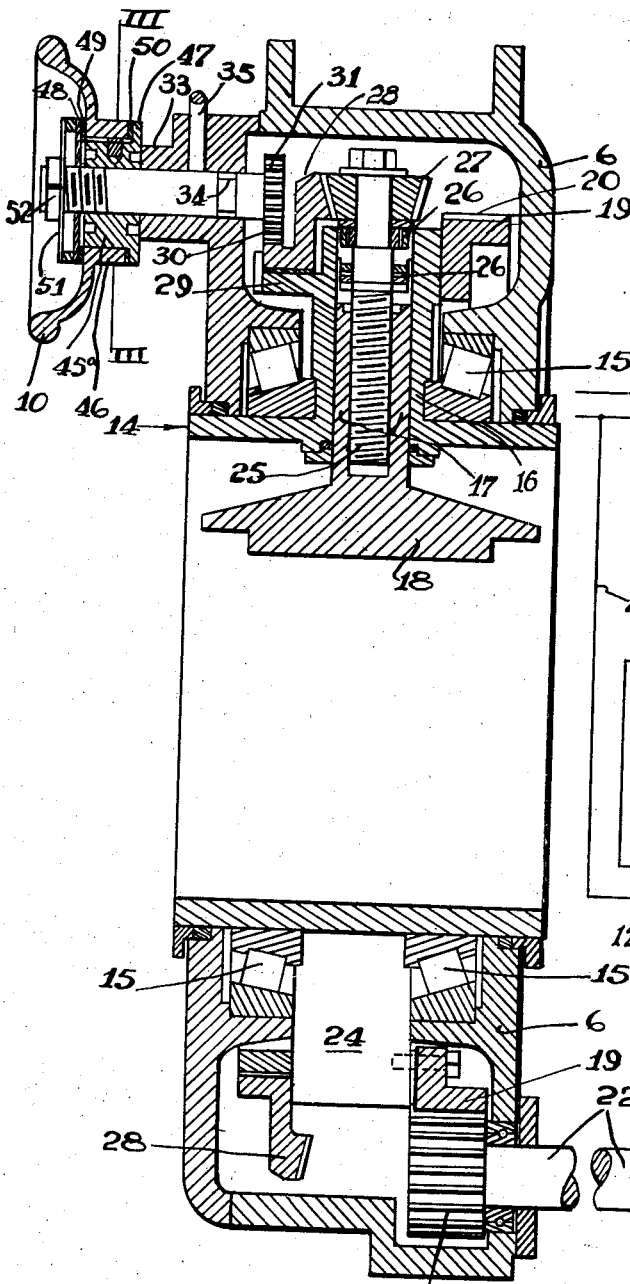
Figure 4:
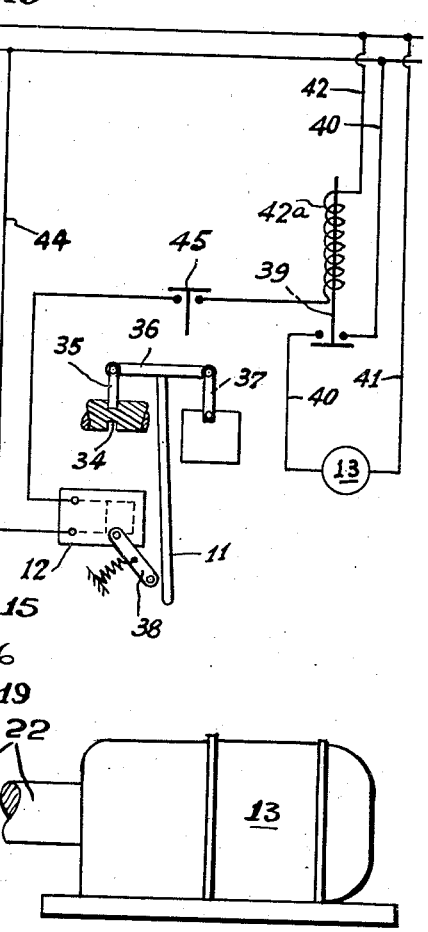

A further difficulty which arises with chucks of the kind above described is the application of too great clamping force by the jaws of the chuck which may deform a blank (such as a thin walled cylinder) and result in improper machining thereof. The present invention is designed to overcome this difficulty by the provision of means in the line of connections between the hand wheel or other turning device which screws the jaws in of such character that only a predetermined force can be applied to the blank by the jaws regardless of the force applied to the turning device. This is accomplished by a friction clutch in the train of connections, in conjunction with a positive drive in the reverse direction, so that no difficulty will be encountered in releasing the blank despite the presence of the friction clutch. One embodiment of the invention is illustrated in the accompanying drawings, wherein:

Figure 1 is a perspective view of a cylinder boring machine equipped with the improved clutch operating mechanism. Fig. 2 is a vertical section through the chuck and operating means. Fig. 3 is a section on the line III—III of Fig. 2. And Fig. 4 is a diagrammatic view showing the wiring arrangement.

The machine shown comprises a base casting 5 having at one end a housing 6 for the chuck which carries the blank 7 to be machined; a carriage 8 movable longitudinally of the machine and carrying the tool which bores out the blank; means in the casing for moving the carriage back and forth; a loading table 9 for supporting the blanks in the loading and unloading operations; facing tools on each side of the chuck housing which are of no moment in so far as the invention here is concerned; the hand wheel 10 mounted on the chuck housing and serving to move the chuck jaws in and out, as later described; the handle 11 which cooperates with the switch 12 and gives safety control of the operation of the hand wheel; and a motor 13 (Fig. 2) located in or adjacent to the base casting 5 and serving to rotate the chuck.

The general chuck structure is well known in the art, and comprises a frame member 14 mounted for rotation in the housing 6 on the roller bearings 15 and provided with sleeve portions 16 through which the stems 17 of the three chuck jaws 18 extend. The frame has bolted to one side the ring 19 having the spur teeth 20 around its periphery. The ring is driven by the spur pinion 21 on the shaft 22 which is driven from the motor 13 through suitable reduction gearing.

The stems 17 of the chuck jaws are slidable through sleeves 16 and are threaded internally to receive the shafts 25 which are swivelled at their outer ends, as indicated at 26. The outer ends of the shafts 25 have the bevel pinions 27 secured thereto and mesh with the gear 28 which is in the form of a ring journalled on a hub 29 integral with the chuck frame. The rotation of this gear 28 on its hub provides for the rotation of the shafts 25 and the movement of the jaws of the chuck in and out.

The ring 28 is also provided with spur teeth 30 around its periphery which engage a pinion 31 on the shaft 32 to the outer end of which the hand wheel 10, heretofore referred to, is attached. The shaft 32 is mounted for sliding endwise movement on the hub 33, and when in the position shown, the rotation of the shaft will move the chuck jaws in or out, depending on the direction of the rotation. To disengage the pinion 31 from driving relation with the teeth 30, the shaft is moved to the left. Safety means are provided for locking the shaft in disengaged position in the form of the groove 34 and cooperating pin 35 which drops into the groove when the groove is in alinement therewith.

The pin 35 is pivoted to one arm of the lever 36

(Figs. 1 and 4) whose other arm is supported on the chuck housing by means of the link 37. The lever is provided with a handle 11, heretofore referred to, which when swung so as to lift the pin 35, engages the handle 38 of the switch 12 and moves it to open position. This movement interrupts the electric circuit through the motor 13 (Figs. 2 and 4) which rotates the chuck. Since the shaft 32 can not be moved to the right to engage the pinion 31 with the gear teeth 30, until the pin is lifted and the electric circuit interrupted at the switch 12, the operator is protected from inadvertently bringing the hand wheel 10 and driving connections into gear with the chuck while the chuck is being driven by the motor. The circuit for controlling the operation of the motor 13 from the switch 12 will be seen by reference to Fig. 4. The motor lies in a circuit including the relay bar 39 and wires 40 and 41. The winding 42 of the relay lies in a circuit including the wires 42, 43 and 44 and the switch 12. When the switch arm is swung to the left by the handle 11, the switch is opened interrupting the circuit through the coil 42a of the relay which opens, interrupting the motor circuit. When the handle 11 is swung to the right incident to the pin 35 being allowed to move into the groove 34, the switch handle 38 moves to the right permitting the closing of the switch and energizing the relay winding 42a so that the bar 39 moves to closing position completing the motor circuit. A push button 45 is also provided in the relay circuit to permit starting and stopping of the motor from a convenient position at one side of the machine.

In order to prevent the chuck jaws from being clamped upon the blank with such force as to distort it, a slip connection is provided between the hand wheel 10 and the shaft 32, as illustrated in Fig. 2. Keyed to the shaft is a sleeve 45a, and on the sleeve is rotatably mounted the hub 46 of the hand wheel. The sleeve 45a has integral therewith a flange 47 lying on one side of the hub 46, and on the opposite side of the hub is a plate 48, friction rings 49 and 50 being interposed between the plate and hub and between the hub and the flange 47. The plate is keyed to the shaft 32 and is pressed to the right by the flat spring 51 placed under tension by the nut 52 threaded to the end of the shaft. This arrangement provides a friction slip connection between the hand wheel and the shaft 32, so that only a limited and predetermined clamping force can be applied by the chuck jaws to the blank held thereby.

In order to provide for a positive connection between the hand wheel and the shaft 32, so that the effect of the slip connection is avoided on the reverse movement of the hand wheel, a pawl 53 is pivoted in a recess in the sleeve 45 and held in the position shown in Fig. 3 by a spring 54. The end of the pawl is engaged by one of the three teeth 55 on the hub 46 of the hand wheel when such wheel is turned in a counterclockwise direction (Fig. 3) to release the chuck jaws. It will be seen that the arrangement, as described and illustrated, provides a friction slip connection for tightening the chuck jaws when the hand wheel is turned in one direction and a positive connection for releasing the jaws when the wheel is turned in the reverse direction.

What I claim is:

In a machine tool having a chuck with movable jaws, gearing for moving the jaws in and out, an electric drive for rotating the chuck, a switch controlling said drive, and a hand operated shaft mounted for endwise movement carrying a gear and adapted in one position of endwise movement to bring said gear into driving engagement with said gearing and in another position of endwise adjustment to disengage the gear from said gearing, said shaft being provided with a circumferential groove, means for maintaining said switch in open position comprising a locking pin mounted for sliding movement transversely of said shaft normally pressed toward the shaft and adapted to move into the groove and lock it against endwise movement when the shaft is brought to inoperative position with its gear disengaged from said gearing, and hand operated means for withdrawing the pin from the groove positioned so as to engage the switch and open it when the pin is so withdrawn.

ROBERT L. HIBBARD.